(12) United States Patent
Katou et al.

(10) Patent No.: US 9,843,231 B2
(45) Date of Patent: Dec. 12, 2017

(54) ROTATING ELECTRIC MACHINE INCLUDING ROTOR, ANNULAR STATOR CORE AND MULTI-PHASE STATOR COIL

(71) Applicant: DENSO CORPORATION, Kariya, Aichi-pref. (JP)

(72) Inventors: Hiroki Katou, Anjo (JP); Shigenori Yoneda, Anjo (JP)

(73) Assignee: DENSO CORPORATION, Kariya (JP)

(*) Notice: Subject to any disclaimer, the term of this patent is extended or adjusted under 35 U.S.C. 154(b) by 415 days.

(21) Appl. No.: 14/590,134

(22) Filed: Jan. 6, 2015

(65) Prior Publication Data
US 2015/0200571 A1   Jul. 16, 2015

(30) Foreign Application Priority Data

Jan. 10, 2014   (JP) ................................. 2014-003567

(51) Int. Cl.
*H02K 1/16*   (2006.01)

(52) U.S. Cl.
CPC ......... *H02K 1/165* (2013.01); *H02K 2213/03* (2013.01)

(58) Field of Classification Search
CPC ....... H02K 1/165; H02K 1/16; H02K 2213/03
USPC .................... 310/216.096, 216.093, 216.097
See application file for complete search history.

(56) References Cited

U.S. PATENT DOCUMENTS

| 6,181,047 | B1 * | 1/2001 | Nitta | ...................... | H02K 21/22 |
| | | | | | 310/216.001 |
| 2009/0236925 | A1 * | 9/2009 | Kim | ...................... | H02K 19/106 |
| | | | | | 310/162 |
| 2009/0243423 | A1 * | 10/2009 | Hattori | ................... | H02K 1/165 |
| | | | | | 310/216.092 |
| 2012/0256514 | A1 * | 10/2012 | Junak | ..................... | H02K 1/146 |
| | | | | | 310/216.092 |

FOREIGN PATENT DOCUMENTS

| JP | H06-029353 | 4/1994 |
| JP | 11-178298 | 7/1999 |
| JP | 2007-166710 | 6/2007 |
| JP | 2010-166810 | 7/2010 |

OTHER PUBLICATIONS

Office Action (2 pgs.) dated Feb. 4, 2016 issued in corresponding Japanese Application No. 2014-003567 with an at least partial English language translation (3 pgs.).

* cited by examiner

*Primary Examiner* — Michael Andrews
(74) *Attorney, Agent, or Firm* — Nixon & Vanderhye P.C.

(57) ABSTRACT

A rotating electric machine includes an annular stator core with stator teeth. Each of the stator teeth has a pair of protruding portions that are formed at a distal end of the stator tooth so as to protrude from a main body of the stator tooth respectively toward opposite circumferential sides. Each of the stator teeth has a distal end surface radially facing a rotor. The circumferential lengths of the distal end surfaces of all the stator teeth are equal to each other. The stator teeth are classified into first and second groups. The protruding portions formed in the stator teeth of the first group are first protruding portions and the protruding portions formed in the stator teeth of the second group are second protruding portions. The first protruding portions have a different cross-sectional shape perpendicular to an axial direction of the stator core from the second protruding portions.

6 Claims, 6 Drawing Sheets

ROTATING ELECTRIC MACHINE INCLUDING ROTOR, ANNULAR STATOR CORE AND MULTI-PHASE STATOR COIL

CROSS-REFERENCE TO RELATED APPLICATION

This application is based on and claims priority from Japanese Patent Application No. 2014-3567, filed on Jan. 10, 2014, the content of which is hereby incorporated by reference in its entirety into this application.

BACKGROUND

1 Technical Field

The present invention relates to rotating electric machines that are used in, for example, motor vehicles as electric motors and electric generators.

2 Description of Related Art

There are known IPM (Interior Permanent Magnet) motors that have permanent magnets embedded in a rotor core. The IPM motors can use both reluctance torque and magnetic torque, thereby achieving high efficiency. Therefore, the IPM motors are particularly suitable for use in hybrid and electric vehicles.

An IPM motor generally includes a rotor and a stator. The rotor has a plurality of magnetic poles that are formed by the permanent magnets embedded in the rotor core. The stator includes an annular stator core and a multi-phase stator coil. The stator core is disposed in radial opposition to the rotor. The stator core has a plurality of stator teeth and a plurality of slots. The stator teeth each radially extend and are spaced from one another in a circumferential direction of the stator core. Each of the slots is formed between one circumferentially-facing pair of side surfaces of the stator teeth. The stator coil is comprised of a plurality of phase windings that are mounted on the stator core so as to be received in the slots of the stator core.

Moreover, there are disclosed, for example in Japanese Utility Model Application Publication No. JPH0629353Y2 and Japanese Patent Application Publication No. JP2010166810A (to be respectively referred to as Patent Documents 1 and 2 hereinafter), methods of reducing torque ripple in the IPM motors. More specifically, according to those methods, the stator core is formed by laminating in the axial direction a plurality of types of steel sheets having different circumferential lengths of distal end surfaces of the stator teeth. Consequently, it is possible to realize a skewed structure of the stator core, thereby reducing torque ripple.

However, in the case of applying the method disclosed in Patent Document 1, it is necessary to use a plurality of types of steel sheets having different stator tooth shapes to form the stator core. Moreover, the number of types of the steel sheets increases with the degree of skewing the stator core. Consequently, the man-hours required for processing the steel sheets is increased, resulting in an increase in the manufacturing cost of the stator core.

In the case of applying the method disclosed in Patent Document 2, the areas of the distal end surfaces of the stator teeth facing the rotor are reduced. Consequently, the amount of magnetic flux flowing through the stator teeth is accordingly reduced, thereby lowering the torque generated by the IPM motor.

SUMMARY

According to an exemplary embodiment, there is provided a rotating electric machine which includes a rotor, an annular stator core and a multi-phase stator coil. The rotor has a plurality of magnetic poles. The stator core is disposed in radial opposition to the rotor and has a plurality of stator teeth and a plurality of slots. The stator teeth each radially extend and are spaced from one another in a circumferential direction of the stator core. Each of the slots is formed between one circumferentially-facing pair of side surfaces of the stator teeth. The stator coil is comprised of a plurality of phase windings that are mounted on the stator core so as to be received in the slots of the stator core. Moreover, each of the stator teeth has a pair of protruding portions that are formed at a distal end of the stator tooth so as to protrude from a main body of the stator tooth respectively toward opposite circumferential sides. Each of the stator teeth has a distal end surface that is defined by the main body and protruding portions of the stator tooth and radially faces the rotor. The circumferential lengths of the distal end surfaces of all the stator teeth are equal to each other. The stator teeth of the stator core are classified into first and second groups. The protruding portions formed in the stator teeth of the first group are first protruding portions and the protruding portions formed in the stator teeth of the second group are second protruding portions. The first protruding portions have a different cross-sectional shape perpendicular to an axial direction of the stator core from the second protruding portions.

With the above configuration, since the circumferential lengths of the distal end surfaces of all the stator teeth are equal to each other, it is possible to manufacture the stator core by laminating steel sheets of only a single type (i.e., of the same shape). Consequently, the manufacturing cost of the stator core can be reduced.

Moreover, since the first protruding portions have the different cross-sectional shape perpendicular to the axial direction of the stator core from the second protruding portions, it is possible to reduce torque ripple by adjusting the amounts of magnetic fluxes passing through the distal end portions of the stator teeth of the first and second groups.

Furthermore, it is possible to adjust the amounts of magnetic fluxes passing through the distal end portions of the stator teeth of the first and second groups without changing the areas of the distal end surfaces of the stator teeth which radially face the rotor. Therefore, it is possible to prevent torque from being lowered due to reduction in the areas of the distal end surfaces of the stator teeth.

Accordingly, with the above configuration, it is possible to reduce both the manufacturing cost of the stator core and torque ripple without lowering torque.

In a further implementation, the first protruding portions have a different cross-sectional area perpendicular to the axial direction of the stator core from the second protruding portions.

Further, for each of the phase windings of the stator coil, there are provided in the stator core n circumferentially-consecutive slots of the same phase, in which only the phase winding is received, per magnetic pole of the rotor, where n is a natural number greater than or equal to 2. Each of the stator teeth of the first group is formed between one circumferentially-consecutive pair of the slots of the same phase. Each of the stator teeth of the second group is formed between one circumferentially-consecutive pair of the slots of different phases. The cross-sectional area of the second protruding portions formed in the stator teeth of the second group is preferably smaller than the cross-sectional area of the first protruding portions formed in the stator teeth of the first group.

Furthermore, the stator teeth of the second group, in which the second protruding portions are formed, are circumferentially spaced from one another by (n−1) stator teeth.

The annular stator core may be disposed radially outside the rotor so as to surround the rotor. For each of the second protruding portions, a radially outer side surface of the second protruding portion may be preferably oblique to a radially-extending centerline of the stator tooth which includes the second protruding portion, so that the radially outer side surface approaches a radially inner periphery of the stator core as it extends from the main body of the stator tooth to a tip of the second protruding portion.

It is preferable that $\alpha > \beta$, where a is an angle formed between the radially outer side surface of each of the second protruding portions and the radially-extending centerline of the stator tooth which includes the second protruding portion, and $\beta$ is an angle formed between a radially outer side surface of each of the first protruding portions and a radially-extending centerline of the stator tooth which includes the first protruding portion.

It is also preferable that for each of the stator teeth of the first and second groups, the circumferential length of the distal end surface of the stator tooth is constant in the axial direction of the stator core.

It is also preferable that when viewed along the axial direction of the stator core, each of the stator teeth of the first and second groups is formed symmetrically with respect to the radially-extending centerline of the stator tooth.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
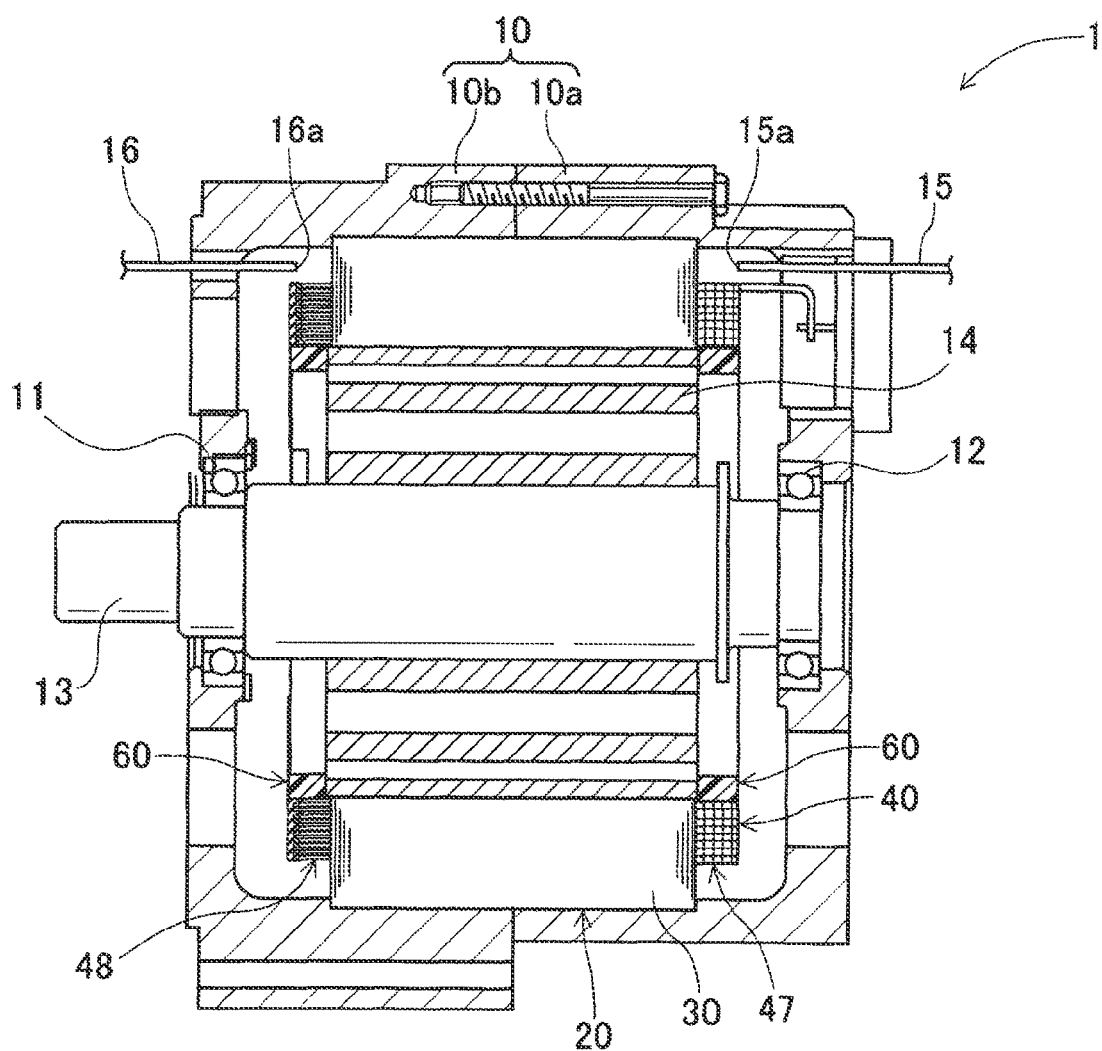
FIG. 1 is a schematic cross-sectional view of a rotating electric machine according to the exemplary embodiment.

FIG. 1 shows the overall configuration of a rotating electric machine 1 according to an exemplary embodiment.

In the present embodiment, the rotating electric machine 1 is configured as an electric motor for use in a motor vehicle.

As shown in FIG. 1, the rotating electric machine 1 includes a housing 10, a rotor 14 and a stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13 so as to rotate together with the rotating shaft 13. The stator 20 is fixed in the housing 10 so as to surround the radially outer periphery of the rotor 14.

Moreover, in the present embodiment, the rotating electric machine 1 further includes a coolant supplier that supplies a liquid coolant to a three-phase stator coil 40 of the stator 20 via a pair of coolant pipes 15 and 16. As shown in FIG. 1, the coolant pipes 15 and 16 are mounted to the housing 10 so as to respectively penetrate end walls of the housing pieces 10a and 10b. The coolant pipe 15 has a discharge outlet 15a formed at its distal end. The discharge outlet 15a is located vertically above a first coil end 47 of the stator coil 40, so as to discharge the liquid coolant to the first coil end 47. Similarly, the coolant pipe 16 has a discharge outlet 16a formed at its distal end. The discharge outlet 16a is located vertically above a second coil end 48 of the stator coil 40, so as to discharge the liquid coolant to the second coil end 48.

Furthermore, in the present embodiment, the rotating electric machine 1 also includes a coolant collector, a coolant pump and a coolant cooler, none of which are shown in the figures. The coolant collector collects the liquid coolant discharged out of the discharge outlets 15a and 16a of the coolant pipes 15 and 16. The coolant pump is provided to deliver the liquid coolant to the coolant supplier. The coolant cooler is provided to cool the liquid coolant which has been heated when passing through the stator coil 40 and collected by the coolant collector. The coolant supplier, the coolant collector, the coolant pump and the coolant cooler together form a coolant circulation circuit for circulating the liquid coolant and thereby cooling the stator coil 40.

In addition, in the present embodiment, ATF (Automotive Transmission Fluid) is used as the liquid coolant. However, it should be appreciated that other conventional liquid coolants, such as cooling oil, may also be used instead of ATF.

The rotor 14 has a plurality of permanent magnets arranged in its circumferential direction at predetermined intervals. The permanent magnets form a plurality of magnetic poles on the radially outer periphery of the rotor 14 facing the radially inner periphery of the stator 20. The polarities of the magnetic poles alternate between north and south in the circumferential direction of the rotor 14. The number of the magnetic poles can be suitably set according to the design specification of the rotating electric machine 1. In the present embodiment, the number of the magnetic poles is set to be equal to, for example, 8 (i.e., four N poles and four south poles).

Referring now to FIGS. 1-5, the stator 20 includes an annular (or hollow cylindrical) stator core 30 and the three-phase stator coil 40. The stator core 30 is disposed radially outside the rotor 14 so as to surround the rotor 14. The stator core 30 has a plurality of slots 31 formed therein; the slots 31 are spaced from one another in the circumferential direction of the stator core 30 at a predetermined pitch. The stator coil 40 is comprised of U-phase, V-phase and W-phase windings that are mounted on the stator core 30 so as to be received in the slots 31 of the stator core 30. More specifically, in the present embodiment, the stator coil 40 is formed by first inserting a plurality of substantially U-shaped electric conductor segments 50 (see FIG. 5) into the slots 31 of the stator core 30 from a first axial side of the stator core 30 (i.e., the upper side in FIG. 5 and the lower side in FIG. 2) and then joining corresponding pairs of distal ends of the electric conductor segments 50 on a second axial side of the stator core 30 (i.e., the lower side in FIG. 5 and the upper side in FIG. 2). In other words, the stator coil 40 is a segment-type stator coil.

Figure 3:
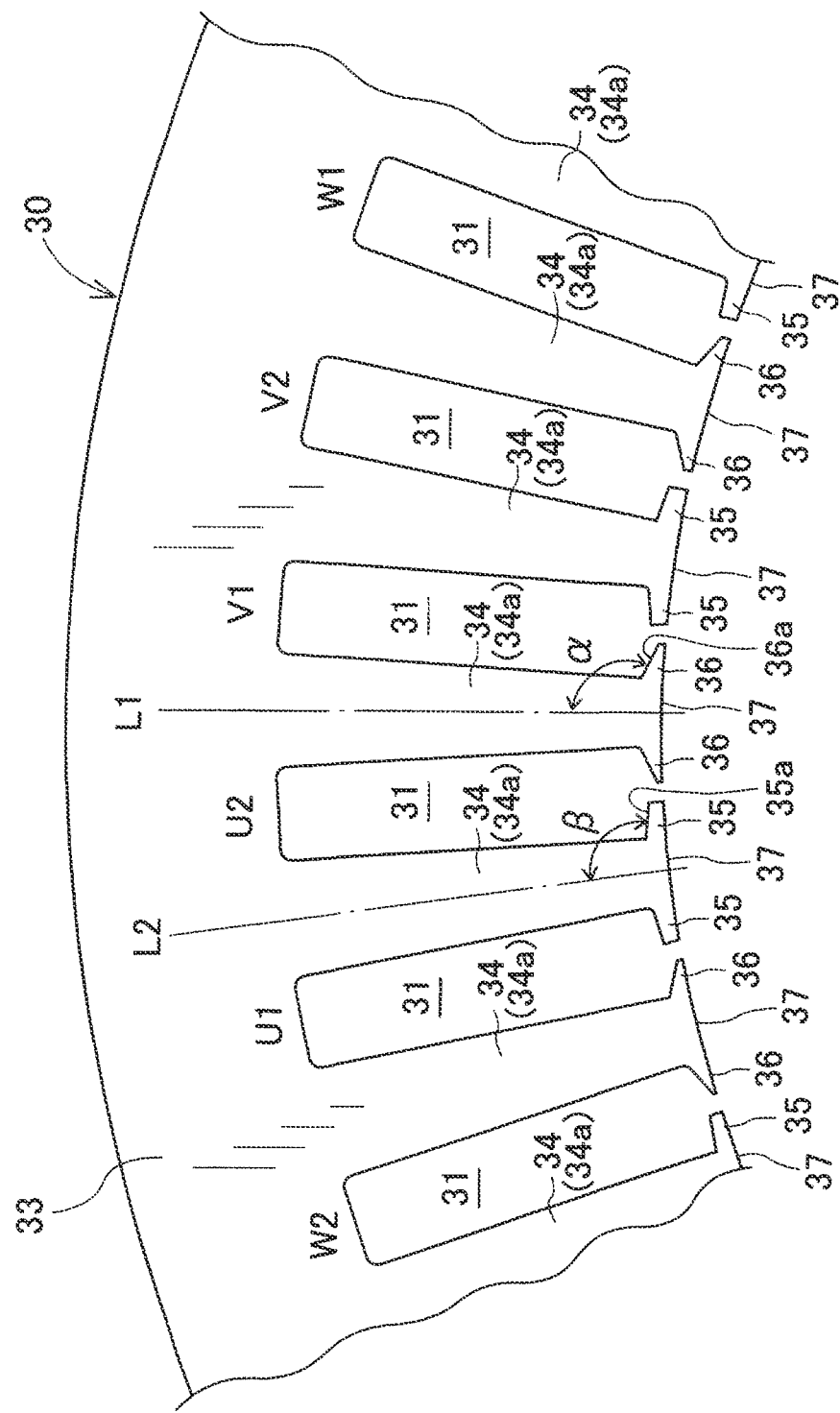
FIG. 3 is a plan view of part of a stator core of the stator.
Figure 4:
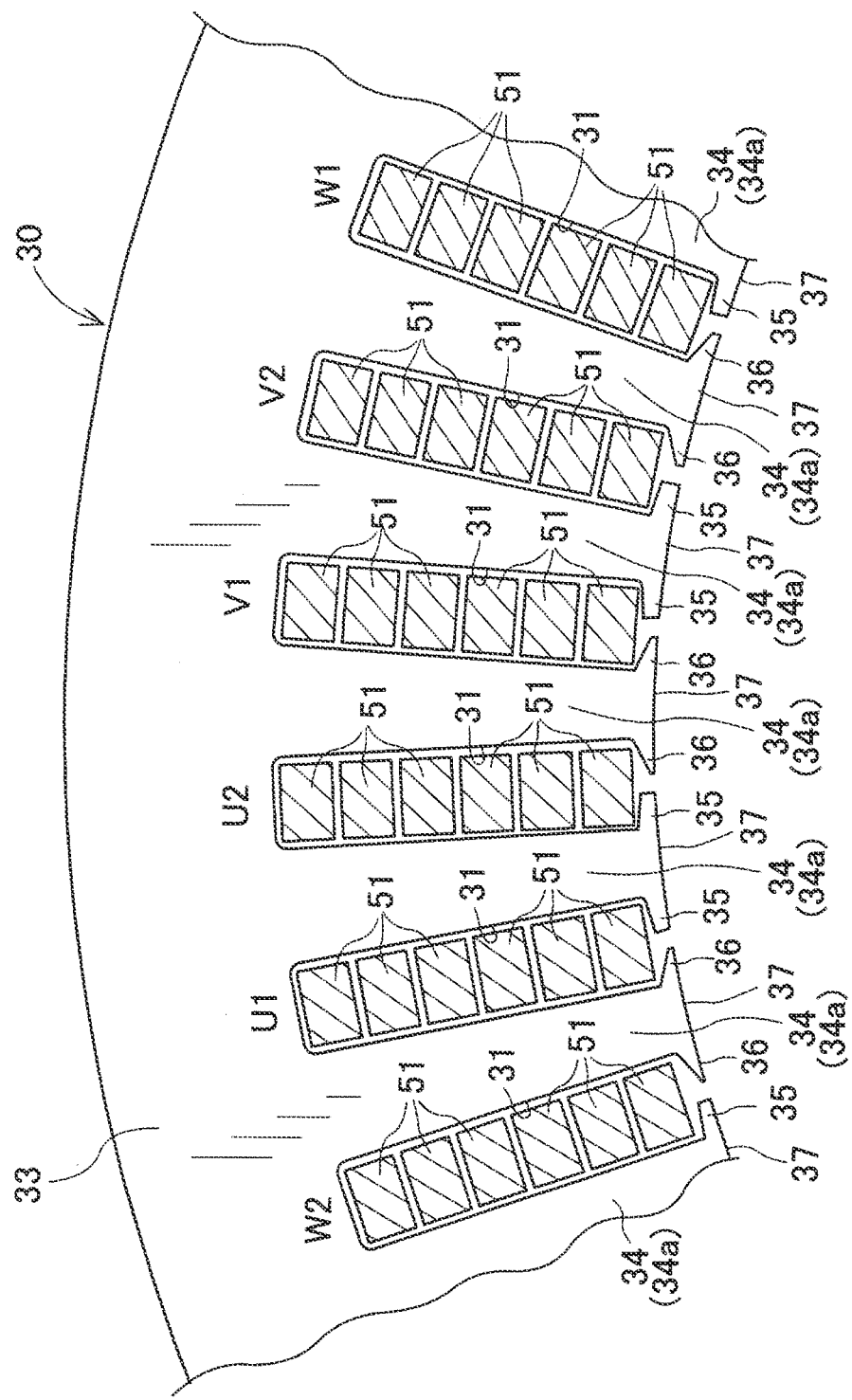
FIG. 4 is a schematic cross-sectional view of part of the stator.

In the present embodiment, the stator core 30 is formed by laminating a plurality of magnetic steel sheets in the axial direction. As shown in FIGS. 3-4, the stator core 30 has an annular back core portion 33 and a plurality of stator teeth 34 that each protrude radially inward from the back core portion 33 and are arranged at predetermined intervals in the circumferential direction of the stator core 30. Between each circumferentially-facing pair of side surfaces of the stator teeth 34, there is formed one of the slots 31 so as to open on the radially inner surface of the stator core 30. That is, in the radially inner surface of the stator core 30, there are formed the slots 31 at a constant pitch in the circumferential direction of the stator core 30. Each of the slots 31 penetrates the stator core 30 in the axial direction of the stator core 30 and has a substantially rectangular cross section perpendicular the axial direction. Moreover, the slots 31 are formed in a radial pattern so that for each of the slots 31, the depth direction of the slot 31 coincides with a radial direction of the stator core 30.

In the present embodiment, the slot multiplier number n (a natural number not less than 2) is set to be equal to 2. That is, in the stator core 30, there are formed two slots 31 per magnetic pole of the rotor 14 that has the eight magnetic poles and per phase of the three-phase stator coil 40. Accordingly, the total number of the slots 31 formed in the stator core 30 is equal to 48 (i.e., 2×8×3).

Moreover, in the present embodiment, for each of the U-phase, V-phase and W-phase windings of the stator coil 40, there are provided in the stator core 30 two circumferentially-consecutive slots 31 of the same phase, in which only the phase winding is received, per magnetic pole of the rotor 14. More specifically, referring to FIGS. 3-4, for the U-phase winding of the stator coil 40, there are provided in the stator core 30 two circumferentially-consecutive U-phase slots U1 and U2, in which only the U-phase winding is received, per magnetic pole of the rotor 14. For the V-phase winding of the stator coil 40, there are provided in the stator core 30 two circumferentially-consecutive V-phase slots V1 and V2, in which only the V-phase winding is received, per magnetic pole of the rotor 14. For the W-phase winding of the stator coil 40, there are provided in the stator core 30 two circumferentially-consecutive W-phase slots W1 and W2, in which only the W-phase winding is received, per magnetic pole of the rotor 14.

Furthermore, in the present embodiment, each of the stator teeth 34 has a pair of protrusions 35 or 36 that are formed at a distal end of the stator tooth 34 so as to protrude from a main body 34a of the stator tooth 34 respectively toward opposite circumferential sides. Moreover, each of the stator teeth 34 has a distal end surface 37 that is defined by the main body 34a and protruding portions 35 or 36 of the stator tooth 34 and radially faces the rotor 14. Further, the circumferential lengths of the distal end surfaces 37 of all the stator teeth 34 are set to be equal to each other.

Moreover, in the present embodiment, all the stator teeth 34 of the stator core 30 are classified into first and second groups. The protruding portions formed in the stator teeth 34 of the first group are first protruding portions 35 and the protruding portions formed in the stator teeth 34 of the second group are second protruding portions 36. The first protruding portions 35 have a different cross-sectional shape perpendicular to the axial direction of the stator core 30 from the second protruding portions 36.

More specifically, each of the stator teeth 34 of the first group is formed between one circumferentially-consecutive pair of the slots 31 of the same phase (i.e., between the U-phase slots U1 and U2, between the V-phase slots V1 and V2 or between the W-phase slots W1 and W2) and has a pair of the first protruding portions 35 formed therein. Each of the first protruding portions 35 has an almost constant radial thickness in the circumferential direction from the main body 34a of the stator tooth 34 to a tip of the first protruding portion 35.

On the other hand, each of the stator teeth 34 of the second group is formed between one circumferentially-consecutive pair of the slots 31 of different phases (i.e., between the U-phase and V-phase slots U2 and V1, between the V-phase and W-phase slots V2 and W1 or between the W-phase and U-phase slots W2 and U1) and has a pair of the second protruding portions 36 formed therein. Each of the second protruding portions 36 is tapered so that the radial thickness of the second protruding portion 36 decreases in the circumferential direction from the main body 34a of the stator tooth 34 to a tip of the second protruding portion 36.

Moreover, in the present embodiment, for each of the second protruding portions 36, a radially outer side surface 36a of the second protruding portion 36 is oblique to a radially-extending centerline L1 of the stator tooth 34 which includes the second protruding portion 36, so that the radially outer side surface 36a approaches the radially inner periphery of the stator core 30 as it extends from the main body 34a of the stator tooth 34 to the tip of the second protruding portion 36.

Furthermore, in the present embodiment, as shown in FIG. 3, the following relationship is satisfied: α>β, where α is an angle formed between the radially outer side surface 36a of each of the second protruding portions 36 and the centerline L1 of the stator tooth 34 which includes the second protruding portion 36, and β is an angle formed between a radially outer side surface 35a of each of the first protruding portions 35 and a radially-extending centerline L2 of the stator tooth 34 which includes the first protruding portion 35.

Satisfying the above relationship, the first protruding portions 35 are different in cross-sectional shape perpendicular to the axial direction of the stator core 30 from the second protruding portions 36. Moreover, as shown in FIG. 3, the first protruding portions 35 have a different cross-sectional area perpendicular to the axial direction of the stator core 30 from the second protruding portions 36. More specifically, in the present embodiment, the first protruding portions 35 have a larger cross-sectional area perpendicular to the axial direction of the stator core 30 than the second protruding portions 36. Consequently, it is more difficult for magnetic flux to pass through the second protruding portions 36 than to pass through the first protruding portions 35.

In the present embodiment, the slot multiplier number n is equal to 2. Therefore, the stator teeth 34 of the second group, in which the second protruding portions 36 are formed, are circumferentially spaced from one another by one (i.e., (n−1)) stator tooth 34. Moreover, for each of the stator teeth 34 of the first and second groups, the circumferential length of the distal end surface 37 of the stator tooth 34 is constant in the axial direction of the stator core 30.

Furthermore, when viewed along the axial direction of the stator core 30, each of the stator teeth 34 of the first and second groups is formed symmetrically with respect to the radially-extending centerline L1 or L2 of the stator tooth 34. That is, in the present embodiment, distal end portions of the stator teeth 34 are not skewed.

As described previously, in the present embodiment, the stator coil 40 is formed by first inserting the substantially U-shaped electric conductor segments 50 into the slots 31 of the stator core 30 from the first axial side of the stator core 30 and then joining (e.g., by welding) corresponding pairs of the distal ends of the electric conductor segments 50 on the second axial side of the stator core 30. Each of the electric conductor segments 50 is obtained by bending a straight electric conductor segment into the substantially U-shape. The straight electric conductor segment has a substantially rectangular cross section and an insulating coat covering its outer surface. The insulating coat may be made, for example, of a polyimide (PI) resin, a polyamide-imide (PAI) resin, a polyphenylene sulfide (PPS) resin or a polyetherether ketone (PEEK) resin.

Figure 5:
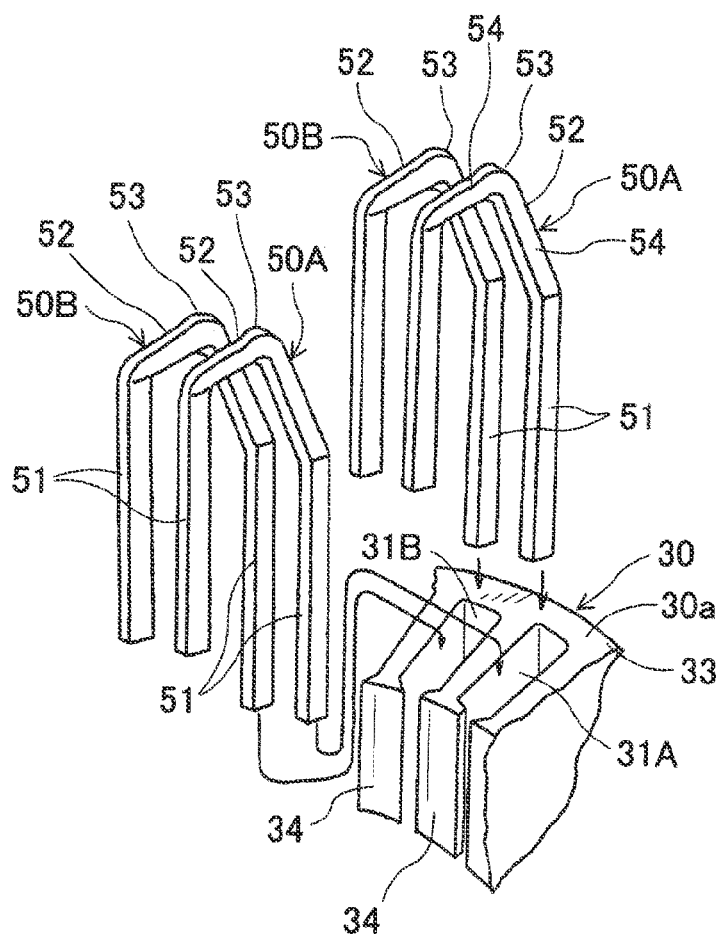
FIG. 5 is a schematic view illustrating electric conductor segments being inserted into slots of the stator core.

As shown in FIG. 5, each of the electric conductor segments 50 is substantially U-shaped to include a pair of straight portions 51 that extend parallel to each other and a turn portion 52 that connects ends of the straight portions 51 on the same side. Further, the turn portion 52 includes an apex part 53 that is formed at the center of the turn portion 52 so as to extend parallel to a first axial end face (i.e., the upper-side axial end face in FIG. 5) 30a of the stator core 30. The turn portion 52 also includes a pair of oblique parts 54 that are formed respectively on opposite sides of the apex part 53 so as to extend obliquely at a predetermined angle with respect to the first axial end face 30a of the stator core 30.

Further, as shown in FIG. 5, in the present embodiment, the electric conductor segments 50 are comprised of a plurality of pairs of electric conductor segments 50A and 50B. For each pair of the electric conductor segments 50A and 50B, the straight portions 51 of the electric conductor segment 50A are inserted in different ones of the slots 31 of the stator core 30 from the straight portions 51 of the electric conductor segment 50B. More specifically, the two slots 31, in which the straight portions 51 of the electric conductor segment 50A are respectively inserted, are respectively circumferentially adjacent to the two slots 31 in which the straight portions 51 of the electric conductor segment 50B are respectively inserted.

For example, for that pair of the electric conductor segments 50A and 50B which is shown on the right upper side in FIG. 5, the electric conductor segment 50A has its right-side straight portion 51 inserted in a sixth layer (i.e., the radially outermost layer) of one slot 31A and its left-side straight portion 51 inserted in a fifth layer of another slot 31C (not shown in FIG. 5) that is positioned away from the slot 31A counterclockwise by one magnetic pole pitch (i.e., a pitch between the N and S poles of the rotor 14). On the other hand, the electric conductor segment 50B has its right-side straight portion 51 inserted in a sixth layer (i.e., the radially outermost layer) of one slot 31B and its left-side straight portion 51 inserted in a fifth layer of another slot 31D (not shown in FIG. 5) that is positioned away from the slot 31B counterclockwise by one magnetic pole pitch. Moreover, the two slots 31A and 31C, in which the straight portions 51 of the electric conductor segment 50A are respectively inserted, are respectively circumferentially adjacent to the two slots 31B and 31D in which the straight portions 51 of the electric conductor segment 50B are respectively inserted. That is, the electric conductor segments 50A and 50B are circumferentially offset from each other by one slot pitch.

In the above-described manner, in each of the slots 31 of the stator core 30, there are inserted an even number of the straight portions 51 of the electric conductor segments 50. More particularly, in the present embodiment, as shown in FIG. 5, in each of the slots 31, there are inserted six straight portions 51 of the electric conductor segments 50 so as to be radially stacked in six layers in the slot 31.

Further, for each of the electric conductor segments 50, free end parts of the straight portions 51 of the electric conductor segment 50, which protrude outside of the slots 31 on the second axial side of the stator core 30, are twisted respectively toward opposite sides in the circumferential direction of the stator core 30 so as to extend obliquely at a predetermined angle with respect to a second axial end face (i.e., the lower-side axial end face in FIG. 5 and the upper-side axial end face in FIG. 2) 30a of the stator core 30. Consequently, the free end parts of the straight portions 51 are respectively transformed into a pair of oblique parts 55 (see FIG. 2) of the electric conductor segment 50. Each of the oblique parts 55 extends in the circumferential direction of the stator core 30 for substantially half a magnetic pole pitch.

Thereafter, on the second axial side of the stator core 30, each corresponding pair of distal ends of the oblique parts 55 of the electric conductor segments 50 are welded, thereby electrically connecting the electric conductor segments 50 in a predetermined pattern. As a result, the stator coil 40 is obtained which includes the U-phase, V-phase and W-phase windings. Each of the U-phase, V-phase and W-phase windings is formed of a predetermined number of the electric conductor segments 50 that are electrically connected in series with one another. Moreover, each of the U-phase, V-phase and W-phase windings is wave-wound around the stator core 30 by six turns in the circumferential direction of the stator core 30.

In addition, in the present embodiment, the U-phase, V-phase and W-phase windings are star-connected. Each of the U-phase, V-phase and W-phase windings also includes special-shaped electric conductor segments (not shown in the figures) whose shapes are different from the substantially U-shape of the electric conductor segments 50. Those special-shaped electric conductor segments include: electric conductor segments that form output and neutral terminals (or leads) of the phase winding; and electric conductor segments that connect two consecutive turns (e.g., the first and second turns) of the phase winding.

Referring again to FIG. 2, in the present embodiment, on the first axial side of the stator core 30, all the turn portions 52 of the electric conductor segments, which protrude from the first axial end face 30a of the stator core 30, together make up the first coil end 47 of the stator coil 40. On the second axial side of the stator core 30, all of the oblique parts 55 of the electric conductor segments 50, which protrude from the second axial end face 30a of the stator core 30, and the welds (or joints) formed between the distal ends of the oblique parts 55 together make up the second coil end 48 of the stator coil 40. In addition, at the first and second coil ends 47 and 48, the electric conductor segments 50 are arranged in a net-like shape so that there are formed air gaps between the electric conductor segments 50.

Figure 2:
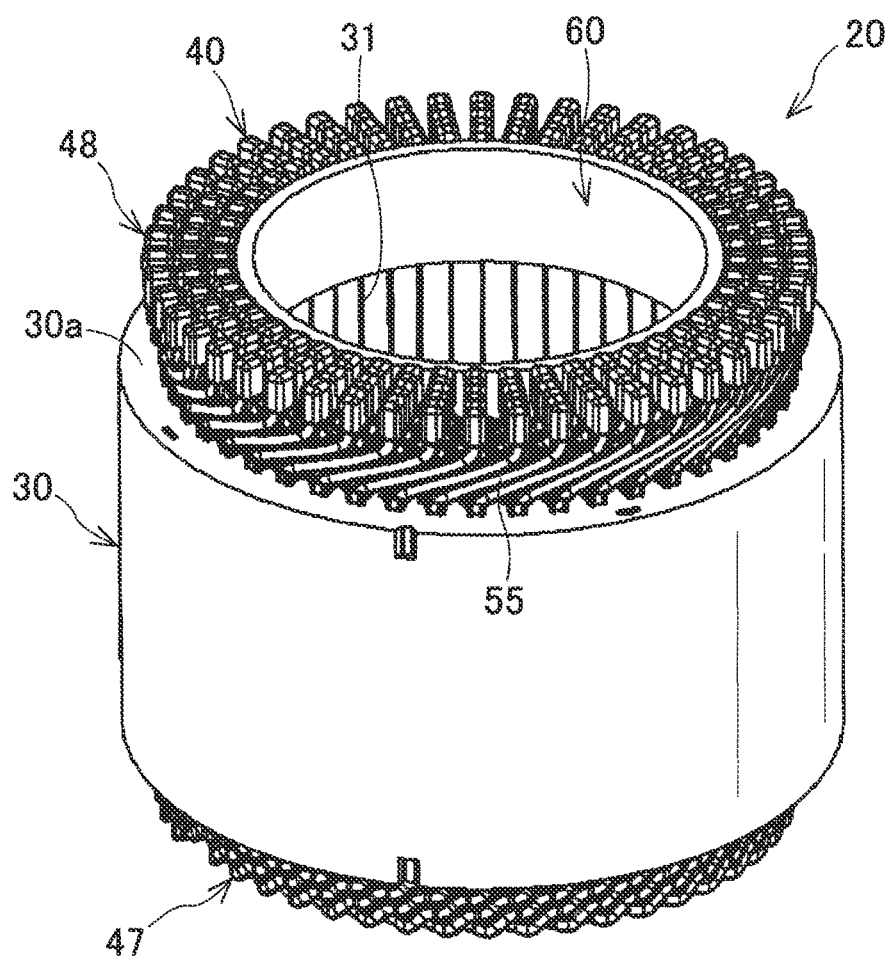
FIG. 2 is a perspective view of a stator of the rotating electric machine.

Moreover, as shown in FIGS. 1-2, on the radially inside of each of the first and second coil ends 47 and 48, there is provided a shield member 60 to prevent the liquid coolant, which has been discharged to the coil end, from flowing radially inward of the coil end. The shield member 60 is formed in an annular shape with a substantially constant thickness. Further, the shield member 60 is mounted to the radially inner periphery of the coil end by press fitting.

In operation of the rotating electric machine 1 according to the present embodiment, a three-phase electric current is supplied to the stator coil 40, thereby energizing the stator 20. Upon energization of the stator 20, rotating torque is generated, causing the rotor 14 to rotate together with the rotating shaft 13. The generated torque is then outputted, via the rotating shaft 13, to other rotating machines and devices which are mechanically connected with the rotating shaft 13.

Figure 6:
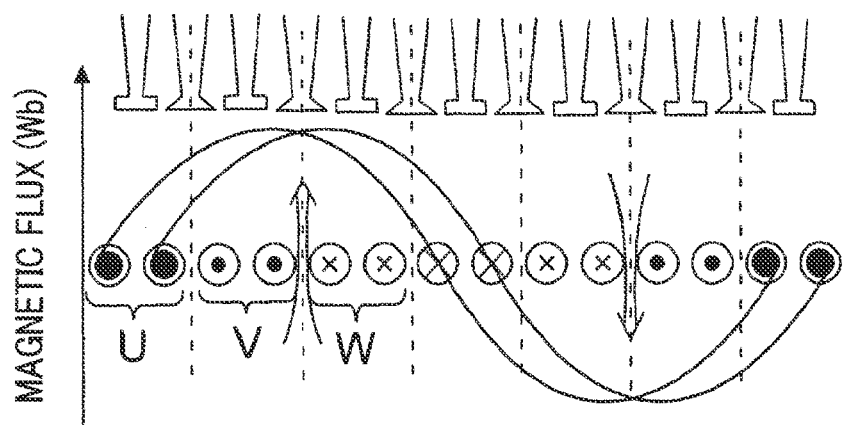
FIG. 6 is a schematic view illustrating magnetic flux generated in the stator.

As described previously, in the present embodiment, the number of the magnetic poles of the rotor 14 is equal to 8 and the slot multiplier number n is equal to 2. Therefore, as shown in FIG. 6, for each of U, V and W phases, there exist positions through which a large amount of magnetic flux flows and which are spaced at a pitch of 180° in electrical angle. Further, since the number of phases of the stator coil 40 is equal to 3 and 180°÷3=60°, considering the U, V and W phases together, there exist positions through which a large amount of magnetic flux flows and which are spaced at a pitch of 60° in electrical angle. In addition, those stator teeth 34 through which a large amount of magnetic flux flows alternate at a pitch of 30° in electrical angle with those stator teeth 34 through which a small amount of magnetic flux flows.

In view of the above, in the present embodiment, the cross-sectional area of the second protruding portions 36 formed in the stator teeth 34 of the second group is set to be smaller than the cross-sectional area of the first protruding portions 35 formed in the stator teeth 34 of the first group. This is because a large amount of magnetic flux flows through the stator teeth 34 of the second group. As described previously, each of the stator teeth 34 of the second group is formed between one circumferentially-consecutive pair of the slots 31 of different phases (i.e., between the U-phase and V-phase slots U2 and V1, between the V-phase and W-phase slots V2 and W1 or between the W-phase and U-phase slots W2 and U1). Consequently, setting the cross-sectional area of the second protruding portions 36 as above, it is possible to reduce the amount of magnetic flux entering the second protruding portions 36, thereby reducing torque ripple.

To confirm the effects of the above-described structure of the stator core 30 according to the present embodiment, the inventors of the present invention have conducted an experiment.

Specifically, in the experiment, the relationship between torque and electric current was investigated with three different stator cores, i.e., the stator core 30 according to the present embodiment, a stator core according to a first comparative example and a stator core according to a second comparative example. The stator core according to the first comparative example had protruding portions formed in the stator teeth; all the protruding portions were identical to the first protruding portions 35 in the stator core 30 according to the present embodiment. The stator core according to the second comparative example had distal end portions of the stator teeth skewed. Further, the circumferential length of the distal end surfaces of the stator teeth in the stator core according to the second comparative example was set to be smaller than that in the stator core according to the first comparative example. The results of the investigation are shown in FIG. 7.

Figure 8:
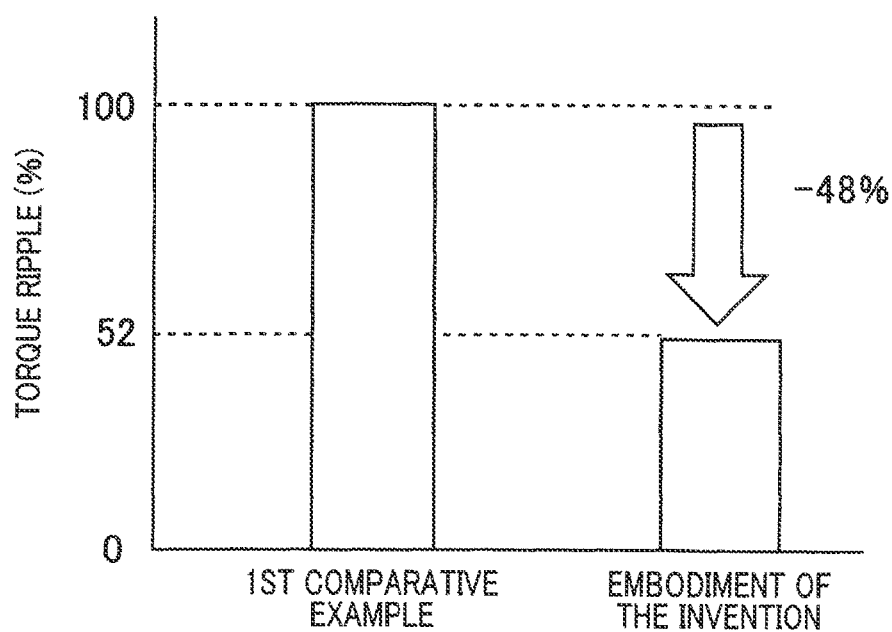
FIG. 8 is a graphical representation giving a comparison in terms of torque ripple between the stator cores according to the exemplary embodiment and the first comparative example.

Moreover, in the experiment, the 24th harmonic of torque, which causes torque ripple, was measured with the stator core 30 according to the present embodiment and the stator core according to the first comparative example. FIG. 8 gives a comparison in torque ripple (represented by the 24th harmonic of torque) between the stator core 30 according to the present embodiment and the stator core according to the first comparative example.

Figure 7:
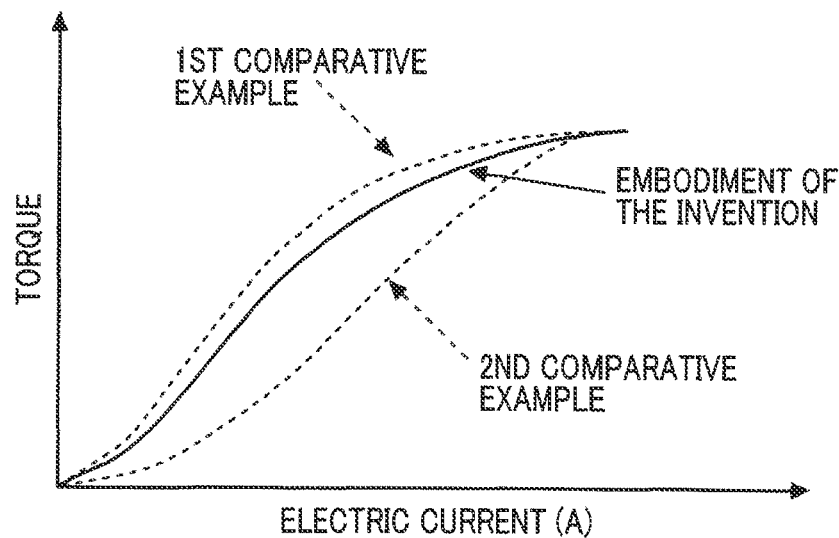
FIG. 7 is a graphical representation giving a comparison in terms of torque between the stator core according to the exemplary embodiment and stator cores according to first and second comparative examples.

As seen from FIGS. 7-8, with the stator core according to the first comparative example, it was possible to increase torque. However, at the same time, torque ripple was also increased.

Moreover, as seen from FIG. 7, with the stator core according to the second comparative example, torque was reduced due to the reduction in the circumferential length of the distal end surfaces of the stator teeth.

In comparison, as seen from FIGS. 7-8, with the stator core 30 according to the present embodiment, it was possible to secure sufficient torque in the low-load region while considerably reducing torque ripple. In particular, compared to the stator core according to the first comparative example, the torque ripple was reduced by 48%. In addition, in the high-load region, due to the magnetic saturation, the performance of the stator core 30 according to the present embodiment became similar to that of the stator core according to the first comparative example.

The above-described rotating electric machine 1 according to the present embodiment has the following advantages.

In the present embodiment, the rotating electric machine 1 includes the rotor 14 having the eight magnetic poles, the annular stator 30 disposed in radial opposition to the rotor 14, and the three-phase stator coil 40. The stator core 30 has the stator teeth 34 and the slots 31. The stator teeth 34 each radially extend and are spaced from one another in the circumferential direction of the stator core 30. Each of the slots 31 is formed between one circumferentially-facing pair of the side surfaces of the stator teeth 34. The stator coil 40 is comprised of the U-phase, V-phase and W-phase windings that are mounted on the stator core 30 so as to be received in the slots 31 of the stator core 30. Moreover, each of the stator teeth 34 has the pair of protruding portions 35 or 36 that are formed at the distal end of the stator tooth 34 so as to protrude from the main body 34a of the stator tooth 34 respectively toward opposite circumferential sides. Each of the stator teeth 34 has a distal end surface 37 that is defined by the main body 34a and protruding portions 35 or 36 of the stator tooth 34 and radially faces the rotor 14. The circumferential lengths of the distal end surfaces 37 of all the stator teeth 34 are equal to each other. All the stator teeth 34 of the stator core 30 are classified into the first and second groups. The protruding portions formed in the stator teeth 34 of the first group are the first protruding portions 35 and the protruding portions formed in the stator teeth 34 of the second group are the second protruding portions 36. The first protruding portions 35 have the different cross-sectional shape perpendicular to the axial direction of the stator core 30 from the second protruding portions 36.

With the above configuration, since the circumferential lengths of the distal end surfaces 37 of all the stator teeth 34 are equal to each other, it is possible to manufacture the stator core 30 by laminating the magnetic steel sheets of only a single type (i.e., of the same shape). Consequently, the manufacturing cost of the stator core 30 can be reduced.

Moreover, since the first protruding portions 35 have the different cross-sectional shape perpendicular to the axial direction of the stator core 30 from the second protruding portions 36, it is possible to reduce torque ripple by adjusting the amounts of magnetic fluxes passing through the distal end portions of the stator teeth 34 of the first and second groups.

Furthermore, it is possible to adjust the amounts of magnetic fluxes passing through the distal end portions of the stator teeth 34 of the first and second groups without changing the areas of the distal end surfaces 37 of the stator teeth 34 which radially face the rotor 14. Therefore, it is possible to prevent torque from being lowered due to reduction in the areas of the distal end surfaces 37 of the stator teeth 34.

Accordingly, with the above configuration, it is possible to reduce both the manufacturing cost of the stator core 30 and torque ripple without lowering torque.

Further, in the present embodiment, the first protruding portions 35 have the different cross-sectional area perpendicular to the axial direction of the stator core 30 from the second protruding portions 36.

More specifically, in the present embodiment, for each of the U-phase, V-phase and W-phase windings of the stator coil 40, there are provided in the stator core 30 two (i.e. n) circumferentially-consecutive slots 31 of the same phase, in which only the phase winding is received, per magnetic pole of the rotor 14. Each of the stator teeth 34 of the first group is formed between one circumferentially-consecutive pair of the slots 3 of the same phase. Each of the stator teeth 34 of the second group is formed between one circumferentially-consecutive pair of the slots 31 of different phases. The cross-sectional area of the second protruding portions 36 formed in the stator teeth 34 of the second group is set to be smaller than the cross-sectional area of the first protruding portions 35 formed in the stator teeth 34 of the first group.

Consequently, though a large amount of magnetic flux flows through the stator teeth 34 of the second group, it is still possible to reduce the amount of magnetic flux entering the second protruding portions 36, thereby reducing torque ripple.

In the present embodiment, the stator teeth 34 of the second group, in which the second protruding portions 36 are formed, are circumferentially spaced from one another by one (i.e., (n−1)) stator tooth 34.

With the above arrangement, it is possible to more effectively reduce torque ripple over the entire circumference of the stator core 30.

In the present embodiment, the annular stator core 30 is disposed radially outside the rotor 14 so as to surround the rotor 14. For each of the second protruding portions 36, the radially outer side surface 36a of the second protruding portion 36 is oblique to the radially-extending centerline L1 of the stator tooth 34 which includes the second protruding portion 36, so that the radially outer side surface 36a approaches the radially inner periphery of the stator core 30 as it extends from the main body 34a of the stator tooth 34 to the tip of the second protruding portion 36.

With the above configuration, it is possible to easily set the cross-sectional area of the second protruding portions 36 small.

Further, in the present embodiment, the following relationship is satisfied: α>β, where α is the angle formed between the radially outer side surface 36a of each of the second protruding portions 36 and the radially-extending centerline L1 of the stator tooth 34 which includes the second protruding portion 36, and β is the angle formed between the radially outer side surface 35a of each of the first protruding portions 35 and the radially-extending centerline L2 of the stator tooth 34 which includes the first protruding portion 35.

Satisfying the above relationship, it is possible to easily set the cross-sectional area of the second protruding portions 36 to be smaller than the cross-sectional area of the first protruding portions 35.

In the present embodiment, for each of the stator teeth 34 of the first and second groups, the circumferential length of the distal end surface 37 of the stator tooth 34 is constant in the axial direction of the stator core 30. Moreover, when viewed along the axial direction of the stator core 30, each of the stator teeth 34 of the first and second groups is formed symmetrically with respect to the radially-extending centerline L1 or L2 of the stator tooth 34.

With the above configuration, the distal end portions of the stator teeth 34 are not skewed. Consequently, it is possible to reduce the manufacturing cost of the stator core 30.

While the above particular embodiment has been shown and described, it will be understood by those skilled in the art that various modifications, changes, and improvements may be made without departing from the spirit of the present invention.

For example, in the previous embodiment, each of the second protruding portions 36 is tapered so that the radial thickness of the second protruding portion 36 decreases in the circumferential direction from the main body 34a of the stator tooth 34 to the tip of the second protruding portion 36.

However, each of the second protruding portions 36 may be modified to have an almost constant radial thickness in the circumferential direction from the main body 34a of the stator tooth 34 to the tip of the second protruding portion 36. In this case, it is essential that the second protruding portions 36 have a smaller cross-sectional area perpendicular to the axial direction of the stator core 30 than the first protruding portions 35.

Moreover, in the previous embodiment, the slot multiplier number n is equal to 2, so that the stator teeth 34 of the second group, in which the second protruding portions 36 are formed, are circumferentially spaced from one another by one (i.e., (n−1)) stator tooth 34.

However, the slot multiplier number n may be set to a natural number greater than 2. For example, the slot multiplier number n may be equal to 3 so that the stator teeth 34 of the second group are circumferentially spaced from one another by two (i.e., (n−1)) stator teeth 34. Similarly, the slot multiplier number n may be equal to 4 so that the stator teeth 34 of the second group are circumferentially spaced from one another by three (i.e., (n−1)) stator teeth 34.

In the previous embodiment, the present invention is applied to the rotating electric machine 1 which is configured as an electric motor. However, the present invention can also be applied to other rotating electric machines, such as an electric generator or a motor-generator that can selectively function either as an electric motor or as an electric generator.

What is claimed is:

1. A rotating electric machine comprising:
a rotor having a plurality of magnetic poles;
an annular stator core disposed in radial opposition to the rotor, the stator core having a plurality of stator teeth and a plurality of slots, the stator teeth each radially extending and being spaced from one another in a circumferential direction of the stator core, each of the slots being formed between one circumferentially-facing pair of side surfaces of the stator teeth; and
a multi-phase stator coil comprised of a plurality of phase windings that are mounted on the stator core so as to be received in the slots of the stator core, wherein
each of the stator teeth has a pair of protruding portions that are formed at a distal end of the stator tooth so as to protrude from a main body of the stator tooth respectively toward opposite circumferential sides,
each of the stator teeth has a distal end surface that is defined by the main body and protruding portions of the stator tooth and radially faces the rotor,
circumferential lengths of the distal end surfaces of all the stator teeth are equal to each other,
the stator teeth of the stator core are classified into first and second groups,
the protruding portions formed in the stator teeth of the first group are first protruding portions and the protruding portions formed in the stator teeth of the second group are second protruding portions, and
the first protruding portions have a different cross-sectional shape perpendicular to an axial direction of the stator core from the second protruding portions;
the annular stator core is disposed radially outside the rotor so as to surround the rotor, and
for each of the second protruding portions, the radially outer side surface of the second protruding portion is oblique to the radially-extending centerline of the stator tooth which includes the second protruding portion, so that the radially outer side surface approaches a radially inner periphery of the stator core as it extends from the main body of the stator tooth to a tip of the second protruding portion; and
the following relationship is satisfied: α>β, where α is the angle formed between the radially outer side surface of each of the second protruding portions and the radially-extending centerline of the stator tooth which includes the second protruding portion, and β is an angle formed between the radially outer side surface of each of the first protruding portions and a radially-extending centerline of the stator tooth which includes the first protruding portion.

2. The rotating electric machine as set forth in claim 1, wherein the first protruding portions have a different cross-sectional area perpendicular to the axial direction of the stator core from the second protruding portions.

3. The rotating electric machine as set forth in claim 2, wherein for each of the phase windings of the stator coil, there are provided in the stator core n circumferentially-consecutive slots of the same phase, in which only the phase winding is received, per magnetic pole of the rotor, where n is a natural number greater than or equal to 2,
each of the stator teeth of the first group is formed between one circumferentially-consecutive pair of the slots of the same phase,
each of the stator teeth of the second group is formed between one circumferentially-consecutive pair of the slots of different phases, and
the cross-sectional area of the second protruding portions formed in the stator teeth of the second group is smaller than the cross-sectional area of the first protruding portions formed in the stator teeth of the first group.

4. The rotating electric machine as set forth in claim 3, wherein the stator teeth of the second group, in which the second protruding portions are formed, are circumferentially spaced from one another by (n−1) stator teeth.

5. The rotating electric machine as set forth in claim 1, wherein for each of the stator teeth of the first and second groups, the circumferential length of the distal end surface of the stator tooth is constant in the axial direction of the stator core.

6. The rotating electric machine as set forth in claim 1, wherein when viewed along the axial direction of the stator core, each of the stator teeth of the first and second groups is formed symmetrically with respect to a radially-extending centerline of the stator tooth.

\* \* \* \* \*